(12) United States Patent
Hummelshøj

(10) Patent No.: US 10,546,202 B2
(45) Date of Patent: Jan. 28, 2020

(54) PROVING HYPOTHESES FOR A VEHICLE USING OPTIMAL EXPERIMENT DESIGN

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 34 days.

(21) Appl. No.: 15/842,270

(22) Filed: Dec. 14, 2017

(65) Prior Publication Data

US 2019/0188499 A1 Jun. 20, 2019

(51) Int. Cl.
| | | |
|---|---|---|
| *G05D 1/02* | (2006.01) | |
| *G06K 9/52* | (2006.01) | |
| *B25J 19/02* | (2006.01) | |
| *G06T 17/05* | (2011.01) | |
| *B25J 9/16* | (2006.01) | |
| *G06K 9/00* | (2006.01) | |

(52) U.S. Cl.
CPC ........ *G06K 9/00805* (2013.01); *B25J 19/021* (2013.01); *G05D 1/0246* (2013.01); *G06K 9/00201* (2013.01); *G06K 9/00785* (2013.01); *G06K 9/52* (2013.01); *G06T 17/05* (2013.01); *B25J 9/1664* (2013.01); *G06T 2200/04* (2013.01)

(58) Field of Classification Search
CPC ................................................. G06K 9/00805
See application file for complete search history.

(56) References Cited

U.S. PATENT DOCUMENTS

| | | | |
|---|---|---|---|
| 9,098,753 B1 | 8/2015 | Zhu et al. | |
| 9,102,055 B1 | 8/2015 | Konolige et al. | |
| 9,855,894 B1 * | 1/2018 | Khorasani | ................ B60R 1/00 |
| 2012/0106800 A1 | 5/2012 | Khan et al. | |
| 2014/0240691 A1 * | 8/2014 | Mheen | ................... G01S 17/89 |
| | | | 356/4.07 |
| 2015/0193988 A1 * | 7/2015 | Jenkins | ................. G07C 5/008 |
| | | | 701/31.5 |
| 2015/0243035 A1 | 8/2015 | Narasimha et al. | |

(Continued)

OTHER PUBLICATIONS

Liebe et al., "Dynamic 3D Scene Analysis from a Moving Vehicle", Conference: IEEE Computer Society Conference on Computer Vision and Pattern Recognition, Jun. 2007, Minneapolis, US, 8 pages.
Cornelis et al., "3D Urban Scene Modeling Integrating Recognition and Reconstruction", International Journal of Computer Vision, 2007, 18 pages.
Knoll et al., "Recognizing Partially Visible Objects Using Feature Indexed Hypotheses" IEEE International Conference on Robotics and Automation, 1986, 58 pages.

(Continued)

*Primary Examiner* — Santiago Garcia
(74) *Attorney, Agent, or Firm* — Christopher G. Darrow; Darrow Mustafa PC

(57) ABSTRACT

Embodiments described herein disclose methods and systems for object recognition using optimal experimental design. Using detection information from the sensor systems, a detection hypothesis can be generated for the detected object. The detection hypothesis can include 3D models, which have distinctive locations. The distinctive locations can be compared to identified distinctive locations using location estimators. Distinctive locations allow for rejection of a hypothesis, should any distinctive location not have an identified distinctive location on the detected object or within the detection information. In this way, recognition of objects can be performed more quickly and efficiently.

20 Claims, 5 Drawing Sheets

(56) References Cited

U.S. PATENT DOCUMENTS

| | | | |
|---|---|---|---|
| 2015/0268058 A1* | 9/2015 | Samarasekera | G06K 9/00637 |
| | | | 701/409 |
| 2015/0269438 A1 | 9/2015 | Samarasekera et al. | |
| 2015/0294465 A1* | 10/2015 | Kojo | G06T 7/80 |
| | | | 348/148 |
| 2016/0140729 A1 | 5/2016 | Soatto et al. | |
| 2016/0357188 A1* | 12/2016 | Ansari | G05D 1/0212 |
| 2017/0124476 A1 | 5/2017 | Levinson et al. | |
| 2017/0124781 A1* | 5/2017 | Douillard | G01S 15/931 |
| 2017/0126810 A1* | 5/2017 | Kentley | H04L 67/125 |
| 2017/0341237 A1* | 11/2017 | Jain | B25J 9/1612 |
| 2018/0136652 A1* | 5/2018 | Jiang | G05D 1/0088 |
| 2018/0314921 A1* | 11/2018 | Mercep | G06K 9/00791 |
| 2018/0372874 A1* | 12/2018 | Lipson | G01S 17/93 |
| 2018/0373253 A1* | 12/2018 | Lipson | G08G 1/165 |
| 2019/0026568 A1* | 1/2019 | Kario | G06K 9/00805 |
| 2019/0041522 A1* | 2/2019 | Slutsky | G01S 17/023 |
| 2019/0086513 A1* | 3/2019 | Lipson | G01S 7/4815 |

OTHER PUBLICATIONS

Yan et al., "3D Model based Object Class Detection in an Arbitrary View", IEEE 11th International Conference on Computer Vision, 2007, 6 pages.

Bolles et al., "Recognizing and Locating Partially Visible Objects: The Local-Feature-Focus Method", The International Journal of Robotics Research, vol. 1, No. 3, Fall 1982, 26 pages.

Hassaballah et al., "Image Features Detection, Description and Matching", Springer International Publishing Switzerland, 2016, 36 pages.

Epshtein et al., "Feature Hierarchies for Object Classification", IEEE 10th International Conference on Computer Vision, 2005, 8 pages.

Sun et al., "Object detection, shape recovery, and 3D modelling by depth-encoded hough voting", Elsevier Inc. Computer Vision and Image Understanding, 2013, pp. 1190-1202 (13 pages).

* cited by examiner

PROVING HYPOTHESES FOR A VEHICLE USING OPTIMAL EXPERIMENT DESIGN

FIELD

The subject matter described herein generally relates to object detection and, more particularly, the recognition of objects using optimal experimental design.

BACKGROUND

Autonomous vehicles, such as vehicles which do not require a human driver, can be used to aid in the transport of passengers or items from one location to another. An important component of an autonomous vehicle system is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles can also use the cameras, sensors, and global positioning devices to gather and interpret images and sensor data about its surrounding environment, e.g., pedestrians, bicyclists, other vehicles, parked cars, trees, buildings, etc. These systems generally use object recognition to make the above determinations and recognitions.

Object recognition is used to determine which, if any, of a set of known objects is present in an image of an observed scene. The object recognition system builds a database of known objects. Information used to build the database may come from controlled observation of known objects, or it may come from an aggregation of objects observed in scenes without formal supervision. Then, a new observation of a previously viewed object is matched with its representation in the database.

SUMMARY

The systems and methods described herein use object recognition with optimal experiment design alongside 3D models in a vehicular environment to prove hypotheses efficiently. In one embodiment, a successive modeling system for object recognition in an environment is disclosed. The successive modeling systems can include one or more processors; and a memory communicably coupled to the one or more processors. The memory can store an object detection module including instructions that when executed by the one or more processors cause the one or more processors to obtain one or more images of a vehicular environment, using at least one image capture device, and to detect an object in the one or more images of the vehicular environment. The memory can further store a hypothesis module including instructions that when executed by the one or more processors cause the one or more processors to form a detection hypothesis for the detected object, to identify at least one of a plurality of 3D models using the detection hypothesis, and to identify a distinctive location on the 3D model usable to confirm or deny the detection hypothesis. The memory can further store a comparison module including instructions that when executed by the one or more processors cause the one or more processors to identify a location on the detected object that corresponds to the identified distinctive location on the 3D model, to compare, using one or more location estimators in the distinctive location on the 3D model, the distinctive location of the 3D model and the identified distinctive location on the detected object, to determine whether the detection hypothesis is confirmed or denied based on the comparison, and to identify the detected object based on the detection hypothesis, when the detection hypothesis is confirmed.

In another embodiment, a non-transitory computer-readable medium for predicting object actions in an environment is disclosed. The non-transitory computer-readable medium can store instructions that when executed by one or more processors cause the one or more processors to obtain one or more images of a vehicular environment, using at least one image capture device. The medium can further store instructions to detect an object in the one or more images of the vehicular environment. The medium can further store instructions to form a detection hypothesis for the detected object. The medium can further store instructions to identify at least one of a plurality of 3D models using the detection hypothesis. The medium can further store instructions to identify a distinctive location on the 3D model usable to confirm or deny the detection hypothesis. The medium can further store instructions to identify a location on the detected object that corresponds to the identified distinctive location on the 3D model. The medium can further store instructions to compare, using one or more location estimators in the distinctive location on the 3D model, the distinctive location of the 3D model and the identified distinctive location on the detected object. The medium can further store instructions to determine whether the detection hypothesis is confirmed or denied based on the comparison. The medium can further store instructions to identify the detected object based on the detection hypothesis, when the detection hypothesis is confirmed.

In another embodiment, a method for discrete object monitoring is disclosed. The method can include obtaining one or more images of a vehicular environment, using at least one image capture device. The method can further include detecting an object in the one or more images of the vehicular environment. The method can further include forming a detection hypothesis for the detected object. The method can further include identifying at least one of a plurality of 3D models using the detection hypothesis. The method can further include identifying a distinctive location on the 3D model usable to confirm or deny the detection hypothesis. The method can further include identifying a location on the detected object that corresponds to the identified distinctive location on the 3D model. The method can further include comparing, using one or more location estimators in the distinctive location on the 3D model, the distinctive location of the 3D model and the identified distinctive location on the detected object. The method can further include determining whether the detection hypothesis is confirmed or denied based on the comparison. The method can further include identifying the detected object based on the detection hypothesis, when the detection hypothesis is confirmed.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Embodiments disclosed herein describe systems and methods for object recognition using optimal experimental design (hereinafter referred to as "successive modeling") in a vehicular environment. In one embodiment, a successive modeling-equipped vehicle can include memory and a database, the database having a 3D model of all detected objects likely to be in an environment. The successive modeling-equipped vehicle can analyze all the objects in the environment. For each detected object, the successive modeling equipped vehicle can detect the detected object and formulate a hypothesis of what the detected object is. The successive modeling-equipped vehicle can then match the detected object to a model based on the hypothesis.

For each model, there can be a plurality of locations on the model that are distinctive (e.g., headlights on a vehicle, wheels of a bicycle, etc.). The successive modeling-equipped vehicle detects the detected object, creates an image of the detected object and formulates the hypothesis that the detected object corresponds to a particular model. The successive modeling-equipped vehicle can then have a number of location estimators (e.g., pixels) from the image that the vehicle compares to the 3D model to verify the hypothesis. In this embodiment, the pixels of the image correspond to the distinctive locations on the model. If the hypothesis is correct, the successive modeling-equipped vehicle continues to look at the next set of pixels until the hypothesis is confirmed. If the hypothesis is ever disconfirmed, the successive modeling-equipped vehicle can formulate a new hypothesis and perform the same analysis.

Once the first hypothesis is confirmed, the successive modeling-equipped vehicle can formulate another hypothesis regarding the detected object, such as a hypothesis of what the detected object is doing. The successive modeling-equipped vehicle can then confirm that hypothesis using the systems and methods described herein. As a result, the successive modeling-equipped vehicle can quickly confirm or deny the hypothesis. Elements of the embodiments disclosed herein are more clearly described with relation to the figures below.

Figure 1:
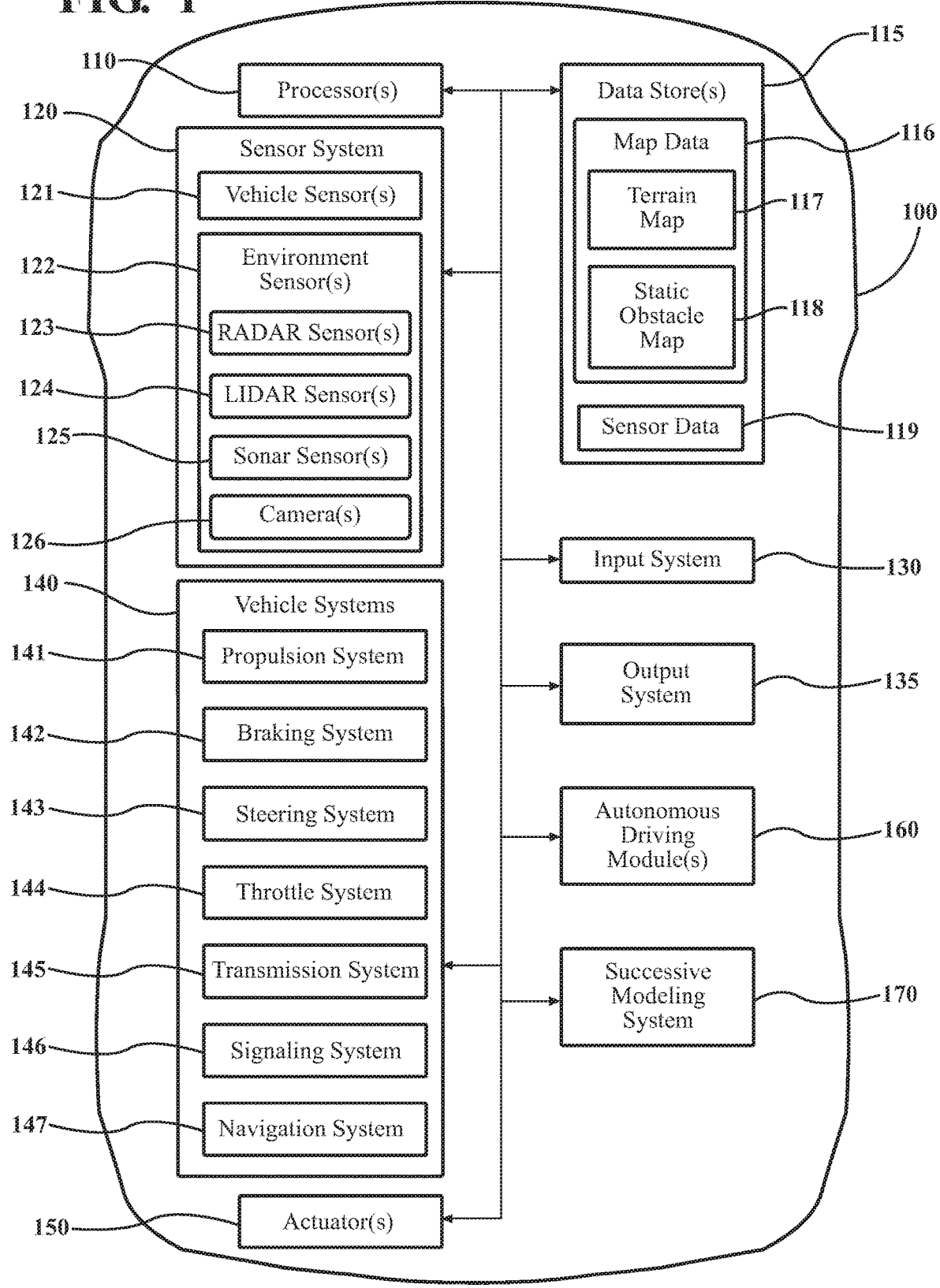
FIG. 1 is a flow diagram of a vehicle incorporating a successive modeling system, according to embodiments described herein

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously. The vehicle 100 can further include a successive modeling or capabilities to support such a system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those having ordinary skill in the art, however, will understand that the embodiments described herein may be practiced using various combinations of these elements.

The vehicle 100 further includes a successive modeling system 170 that is implemented to perform methods and other functions as disclosed herein relating to the determination of objects in the environment. The successive modeling system 170 can include a number of modules configured with instructions to perform the variety of functions listed below. In one example, the vehicle 100 is equipped with the successive modeling system 170, including an object detection module for performing automated detection of a detected object, a hypothesis module having instructions to form a detection hypothesis regarding the detected object, and a comparison module having instructions to compare one or more distinctive locations of the 3D model to one or more identified distinctive locations on the detected object. The other modules or systems described herein can be in communication with all or a part of the successive modeling system 170.

Figure 2:
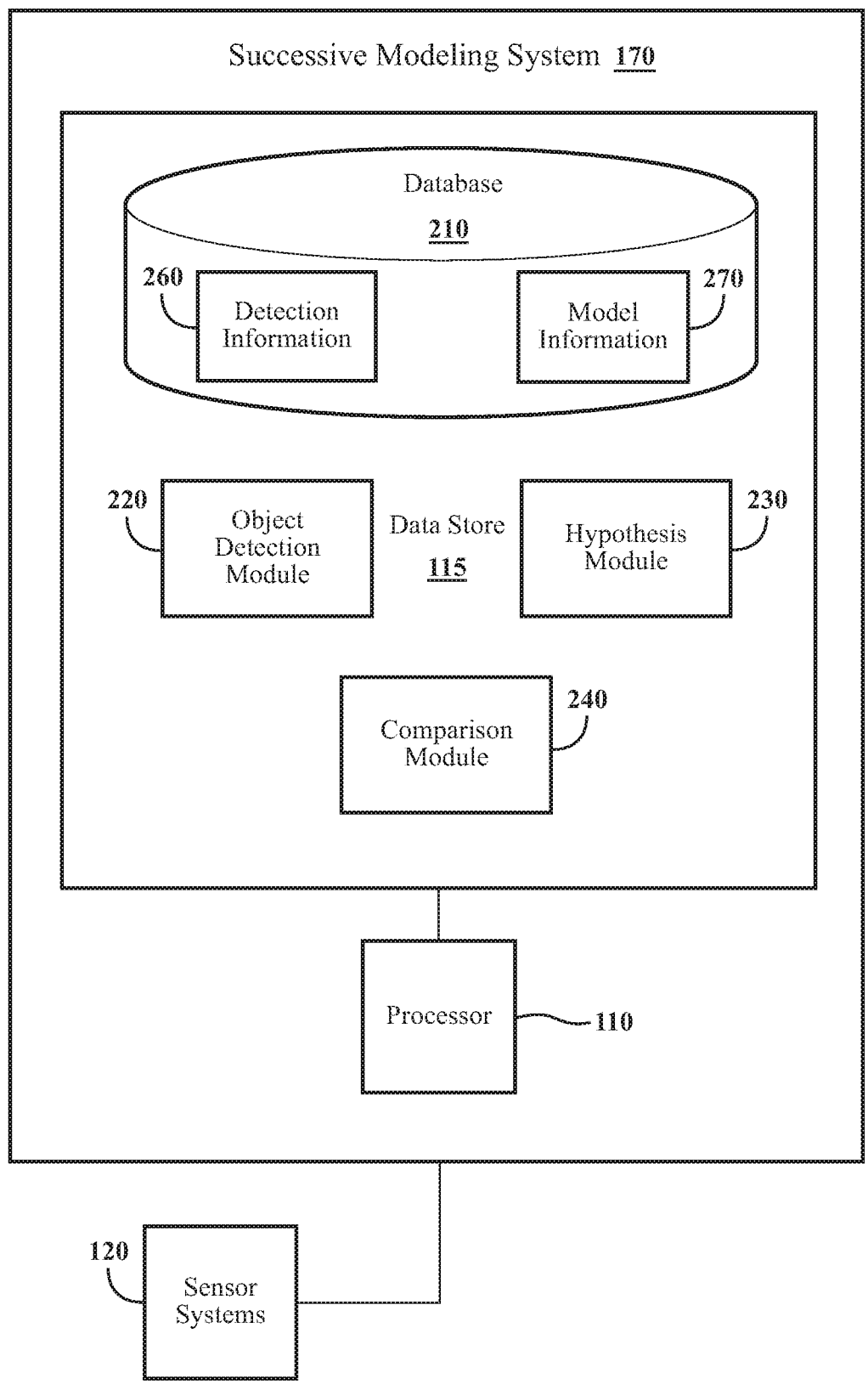
FIG. 2 is an illustration of a successive modeling system using optimal experimental design, according to embodiments described herein

With reference to FIG. 2, one embodiment of the successive modeling system 170 of FIG. 1 is further illustrated. The successive modeling system 170, described herein, employs optimal experimental design, which is an experimental design scheme which is optimal as related to a specific statistical criteria. As practically applied, statistical techniques are used in comparing the 3D model and the data collected about the detected object such that the variance between and among estimators (e.g., the distinctive locations) is minimized to maximize the information produced. In this way, 3D models can be selected and successively compared to the detected object to quickly recognize the detected object.

The successive modeling system 170 is shown as including a processor 110 from the vehicle 100 of FIG. 1. Accordingly, the processor 110 can be a part of the successive modeling system 170, the successive modeling system 170 can include a separate processor from the processor 110 of the vehicle 100, or the successive modeling system 170 can access the processor 110 through a data bus or another communication path. In one embodiment, the successive modeling system 170 includes a data store 115 that stores an object detection module 220, a hypothesis module 230, and a comparison module 240. The data store 115, as described in FIG. 1, can be a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

The object detection module 220 can include instructions that function to control the processor 110 to perform automated detection of a detected object. More specifically, the object detection module 220 can include instructions that when executed by the one or more processors, such as processor 110, cause the one or more processors to obtain one or more images of a vehicular environment, using at least one image capture device, and to detect an object in the one or more images of the vehicular environment. Accordingly, the object detection module 220 generally includes instructions that function to control the processor 110 to retrieve data from sensor systems 120 of the vehicle 100. The object detection module 220 can include instructions which cause the processor 110 to process frame data collected from the sensor systems 120 to detect patterns or shapes on the detected objects, such as features specific to an automobile or a pedestrian, and the output frames in which these patterns or markings were detected are flagged with the detected identifiers. The object detection module 220 can be configured to analyze an image of the environment, to determine the details of the detected objects described above. In this way, the detected object can be identified and given a general classification.

The identification can include raw information that was collected during the detection, regardless whether the raw data was used as part of the detection or not. This identification can then be converted to detection data, which can be stored, processed or otherwise maintained. Optionally, the object detection module 220 can be configured to instruct the processor 110 to accept commands from a user at the vehicle 100 to perform a variety of functions. In one example, the object detection module 220 can be commanded to detect detected objects within a range selected within an environment.

The object detection module 220 can further collect environmental data. The detection can include collecting environmental data using the sensor systems 120. The object detection module 220 can use previously acquired environmental data from the detection information 260 for the environment or the environmental data can be acquired during the monitoring. The environment is defined as the area covered by the field of detection for the sensors, such as the field of view for an image capture device. The field of detection includes detectable aspects of stationary objects and detected objects. The field of detection includes visibility restricted static and detected objects, objects, such as obstructed objects, partially obstructed objects, reasonably anticipated objects (e.g., two walls appear to be converging, so a corner is a reasonably anticipated object even if outside of the field of view), audible characteristics of the detected object and others. In one example, the environment can be an intersection. The environmental data and the detection data can be added to a database 210 as detection information 260.

With continued reference to the successive modeling system 170, in one embodiment, the successive modeling system 170 can include the database 210. The database 210 can be stored in the data store 115. The database 210 is, in one embodiment, an electronic data structure stored in the data store 115 or another data store and that is configured with routines that can be executed by the processor 110 for analyzing stored data, providing stored data, organizing stored data, and so on. Thus, in one embodiment, the database 210 stores data used by the modules 220, 230, and 240 in executing various functions. In one embodiment, the database 210 includes detection information 260 collected by the object detection module 220. In another embodiment, the database 210 can include further information created by the comparison module 240 using, in part, the detection information 260.

The hypothesis module 230 generally includes instructions that function to control the processor 110 to form a detection hypothesis regarding the detected object. In one embodiment, the hypothesis module 230 can include instructions that when executed by the one or more processors, such as processor 110, cause the one or more processors to form a detection hypothesis for the detected object, to identify at least one of a plurality of 3D models using the detection hypothesis, and to identify a distinctive location on the 3D model usable to confirm or deny the detection hypothesis. The hypothesis module 230 can, through the processor 110, form a detection hypothesis regarding the detected object. The detection hypothesis is a determination, based on at least the detection data, of the type of detected object that was detected in the environment. The detection hypothesis may be a grouping of object types based on location, general shape, time frame, or other elements, which are descriptive of the detected object. It should be appreciated that the present disclosure provides an exemplary listing of aspects associated with the detected object that can be monitored to produce the detection data. The detection data can be added to the detection information 260. Further, the detection data can be used to modify existing detection information 260. However, this listing is not to be construed as limiting and is provided as an exemplary list of possibilities for purposes of this discussion.

The detection hypothesis is an analysis which uses detection data to provide a cursory determination regarding the object. The detection data can be derived from the detection information 260. Further, the hypothesis module 230 can use the detection information 260 and contemporaneously collected data, such as environmental data, to reduce the number of objects selected in the detection hypothesis. In general, the detection information 260 is a collection of detection data, observed by the object detection module 220 or the hypothesis module 230, which are subsequently processed and added from detections of the detected object in the environment. Accordingly, by way of example, the detection information 260 can include information about object type and classification, structural or body features, composition, general object space details, environment conditions, and so on. Further, the detection information 260 can be a collection of information from a variety of sources. The variety of sources can include data collected, raw or processed, by the object detection module 220, the hypothesis module 230, and the comparison module 240 during the object monitoring process), or combinations thereof.

The detection hypothesis from the hypothesis module 230 can include associating a 3D model with the detected object. In one embodiment, the comparison module 240 can include instructions that when executed by the one or more processors, such as the processor 110, cause the one or more processors to identify a location on the detected object that corresponds to the identified distinctive location on the 3D model. The comparison module 240 can further compare, using one or more location estimators in the distinctive location on the 3D model, the distinctive location of the 3D model and the identified distinctive location on the detected object. The comparison module 240 can then determine whether the detection hypothesis is confirmed or denied based on the comparison. Finally, the comparison module 240 can identify the detected object based on the detection hypothesis, when the detection hypothesis is confirmed. As noted above, 3D models are stored 3D representations of detected objects which are expected to occur within a selected environment, such as a vehicle environment. As such, the 3D models, which are stored in the model information 270, can vary based on the environment or the type of vehicle (e.g., a tractor can expect different detected objects than an automobile). The 3D model can be selected from the model information using the detection information. The detection information can contain one or more key indicators, applicable for expedited 3D model association. In one example, the detection information contains object height and width information, indicating that the object is a small car. In another example, sound information along with RADAR information, collected using both vehicle sensors 121 and environment sensors 122, are used to indicate a large motorcycle. The 3D model may be selected individually (e.g., individual models are selected to compare) or as part of a group (e.g., a class of object models are selected to compare to the detection data).

The comparison module 240, in one embodiment, generally includes instructions that function to control the processor 110 to compare one or more distinctive locations of the 3D model to one or more identified distinctive locations on the detected object. In comparing the distinctive locations of the 3D model to the identified distinctive locations on the detected object, the detection hypothesis can be confirmed or denied. The distinctive locations are locations of the 3D model which distinguish between the current 3D model and other similar models. These can include positioning or shape of headlights, specific bends or folds in the object, slopes, or other details of the 3D model which are distinguishing or unique. The identified distinctive locations are locations as found on the detected object, as determined from the detection data, that based on size, position, orientation and detection hypothesis data, correlates with the distinctive locations on the 3D model selected in the detection hypothesis.

To compare the distinctive locations, location estimators can be selected. The location estimators can be a set of sites in the distinctive location, such as one or more pixels or a set of pixels, which provide more information about the distinctive location. In one embodiment, the location estimators can provide dispositive information about the distinctive location, when analyzed in light of one another. Thus, the distinctive locations can be compared to the identified distinctive locations without comparing the locations in their entirety. The location estimators can be selected by optimal experimental design, to assure that maximum information is provided by each location estimator. Optimal experimental design is a design method which reduces the number of measurements taken by increasing the information provided per measurement. In this case, we're reducing the number of measurements required for determination of the distinctive location, by selecting pixels or pixel set (e.g., the location estimators) which provide higher than normal information about the site (e.g., the distinctive location). Location estimators can be selected by a number of methods including using previous samples taken from other object recognition schemes to determine which pixels were both present and determinative.

The detection hypothesis can be presumed true until a distinctive location cannot be confirmed against the identified distinctive location in the detection data, such as if the distinctive location cannot be confirmed compared to the identified distinctive location, the hypothesis is rejected. In one example, the detection data include a plurality of images of a small car. Here, the detection hypothesis includes a 3D model of a small car. The 3D model has a selection of distinct locations which are then compared to the identified distinctive locations from the plurality of images (i.e., the detection data). If any one of the distinctive locations cannot be confirmed, the hypothesis can be rejected.

Thus, by way of a brief example, the comparison module 240 can, for example, electronically access the detection information 260 including information about the shape, size, and last known pose of the detected object as compared to the environment, as well as the selected 3D models. Using this information, the comparison module 240 formulates a number of distinctive locations on the 3D model, based on the visible identified distinctive locations as determined from the pose of the detected object (e.g., an rear end view of a car, based on a specific pose in the environment, would likely obstruct distinctive locations related to the wheel or the wheel well, thus the comparison module 240 would exclude those distinctive locations from the analysis). The distinctive locations can have a plurality of associated location estimators, which can be formulated alongside the distinctive locations. From this information, the comparison module 240 can compare the distinctive location of the 3D model to the identified distinctive locations of the detected object. If a distinctive location fails to match an identified distinctive location, the comparison module 240 creates a rejection of the hypothesis about the object in the environment. In this case, the 3D model is disregarded and other 3D models are then tested. Thus, the detection information 260 informs the comparison module 240 about the object based on identified distinctive locations for comparison to the 3D model.

Thus, to recognize the detected object, the comparison module 240, in one embodiment, analyzes the detection information 260 and compares the detection information 260 to the 3D model to determine the appropriate 3D model representation of the detected object. In general, the comparison module 240 identifies the various data elements in relation to the detected object, which provides, for example, exclusion of false positives from the detection hypothesis. Subsequently, the comparison module 240 can associate the 3D model, which was not the subject of a rejected hypothesis, to the detected object. Therefore, the successive modeling system 170, through the comparison module 240, can provide for increased speed in recognizing a detected object.

Figure 3:
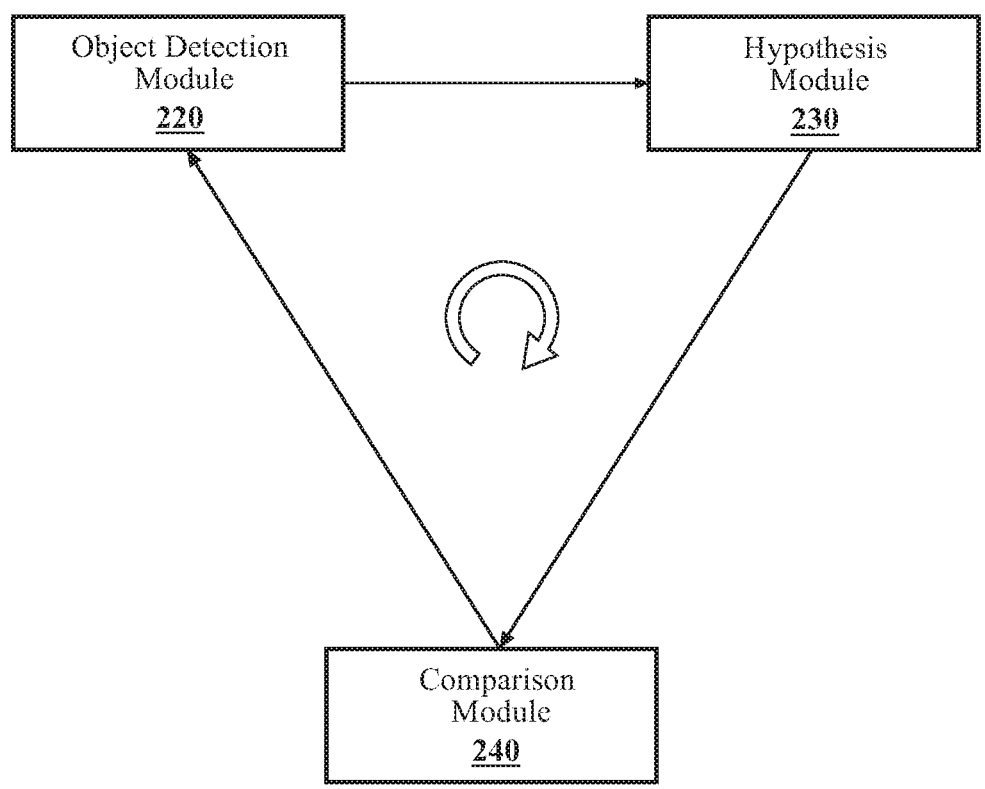
FIG. 3 is a schematic illustration of a feedback loop between elements of the successive modeling system of FIG. 2.

As a further illustration of dynamic aspects relating to how the successive modeling system 170 executes to successively compare 3D models for object recognition, the discussion will now transition to FIG. 3. The successive modeling system 170 can including instructions that when executed by the one or more processors, such as the processor 110, cause the one or more processors to receive a denial of the detection hypothesis, and to reinitialize the object detection module 220, the hypothesis module 230, the comparison module 240 or combinations thereof. The successive modeling system 170, as shown in FIG. 3, generally illustrates one embodiment of how the comparison module 240, the hypothesis module 230, and the object detection module 220 execute in parallel to recognize and inventory detected objects, and how the determination hypothesis can change as the comparison module 240 compares distinctive locations of the 3D model to the identified distinctive locations of the detected object. The successive modeling system 170 can include instructions that function to control the processor 110 to branch from the rejected hypothesis to a subsequent hypothesis. The successive modeling system 170 can include reinitializing the hypothesis module 230 to generate the subsequent hypothesis. In another embodiment, the successive modeling system 170 can include the subsequent hypothesis being generated previously. The successive modeling system 170 can include reinitializing the modules 220, 230, and/or 240, where reinitializing includes executing at least a portion of the instructions of said module.

Thus, as the autonomous driving module 160 autonomously controls the vehicle 100, consider that the object detection module 220 provided detection data about a single moving object. Detection information 260 can include a general classification, such as the general classification of an automobile. In one example, upon being analyzed by the hypothesis module 230, the detection information 260 provides enough information for three possible 3D models and related detection hypotheses. Thus, the object detection module 220 can provide data which can be extrapolated to multiple 3D models by the vehicle 100. In some embodiments, the object detection module 220 can be continuously collecting detection information 260, as the vehicle 100 moves through the environment. The detection hypotheses and the related 3D models can then be forwarded to the comparison module 240, such that distinctive locations on the 3D model can be determined and compares with identified distinctive locations from the detection information 260.

In some embodiments, the successive modeling system 170 can select a plurality of models for comparison to the detected object. In one embodiment, the hypothesis module 230 can further include instructions to identify two or more of the plurality of 3D models using the detection hypothesis, and to identify at least one distinctive location on each of the identified 3D models usable to confirm or deny the detection hypothesis. With the 3D models selected, the comparison module 240 can further include instructions to identify at least one location on the detected object that corresponds to the at least one distinctive location on each of the identified 3D models. The comparison module 240 can then compare, using one or more location estimators in the at least one distinctive location on each of the identified 3D models, the at least one distinctive location of each of the identified 3D models and the at least one identified distinctive location on the detected object. In another example, consider that the hypothesis module 230 uses the detection information 260 to select three possible 3D models and related detection hypotheses. The comparison module 240 makes a determination that distinctive locations on the first 3D model do not properly compare with the identified distinctive locations from the detection information 260, where the identified distinctive locations can be specific portions of an image collected by the sensor systems 120. Here, the first of the three detection hypotheses are rejected, and this rejection is relayed to the branch module 300, using the processor 110.

The successive modeling system 170 may choose one or more branch directions, to address the rejected hypothesis. In one embodiment, the successive modeling system 170 can choose not to branch and continue with the second or the third detection hypothesis, as previously presented by the hypothesis module 230. The successive modeling system 170 can then forward instructions through the processor 110, replacing the rejected hypothesis at the comparison module 240 with the second detection hypothesis or the third detection hypothesis. The second detection hypothesis or the third detection hypothesis can then be tested by the comparison module 240, as described above. In further embodiments, the successive modeling system 170 can choose to branch back to the hypothesis module 230. Upon receiving instructions from the successive modeling system 170, the comparison module 240 to communicate with the hypothesis module 230. In this case, the hypothesis module 230 will reprocess the detection information 260 received from the object detection module 220 and formulate an updated detection hypothesis. The updated detection hypothesis can replace or be added to the second or the third detection hypotheses. The updated detection hypothesis can then be tested by the comparison module 240, as described above.

In a further embodiment, the successive modeling system 170 can choose to branch back to the object detection module 220. In this embodiment, the successive modeling system 170 sends instructions, through the processor 110, to the object detection module 220. The object detection module 220 then collects a new version of the detection information 260 from the sensor systems 120, using the processor 110. The new version of the detection information 260 is then processed by the hypothesis module 230 for a detection hypothesis and compared to the 3D model using the comparison module 240, as described above. In an alternative embodiment, instructions from the successive modeling system 170 involve requesting from the modules 220, 230 or 240 as an intermediate, such as the successive modeling system 170 instructing the comparison module 240 to request the new version of the detection information 260 from the object detection module 220, using the processor 110.

The choice of hypothesis or branch direction by the successive modeling system 170 can be determined by information derived from the modules 220, 230 or 240. The rejection of a hypothesis and the resulting processing can provide data regarding what is more likely to be a preserved hypothesis. The preserved hypothesis is the detection hypothesis which is not rejected after comparison at the comparison module 240. In one example, there are three detection hypotheses, the first, second and third detection hypotheses are two cars and a truck respectively. In this example, the comparison module 240 rejects the first detection hypothesis. This rejection is based on the identified distinctive location from the detection information 260 having a hexagon shape rather than round shape, as compared to the 3D model. In this example, we will also presume that the hexagon shape only exists in a specific type of truck at this identified distinctive location or distinctive location. Using this information, the successive modeling system 170 uses the rejection of the first detection hypothesis to exclude the second rejection hypothesis as well. The successive modeling system 170 then forwards instructions to the processor 110, which causes the comparison module 240 to also reject the second detection hypothesis and continue a comparison using the third detection hypothesis. In further embodiments, information derived from the comparison at the comparison module 240, the hypothesis and 3D model selection at the hypothesis module 230 or the detection data and the environmental data from the object detection module 220 can be used to assist in the choice of hypothesis or branch direction by the successive modeling system 170.

Figure 4:
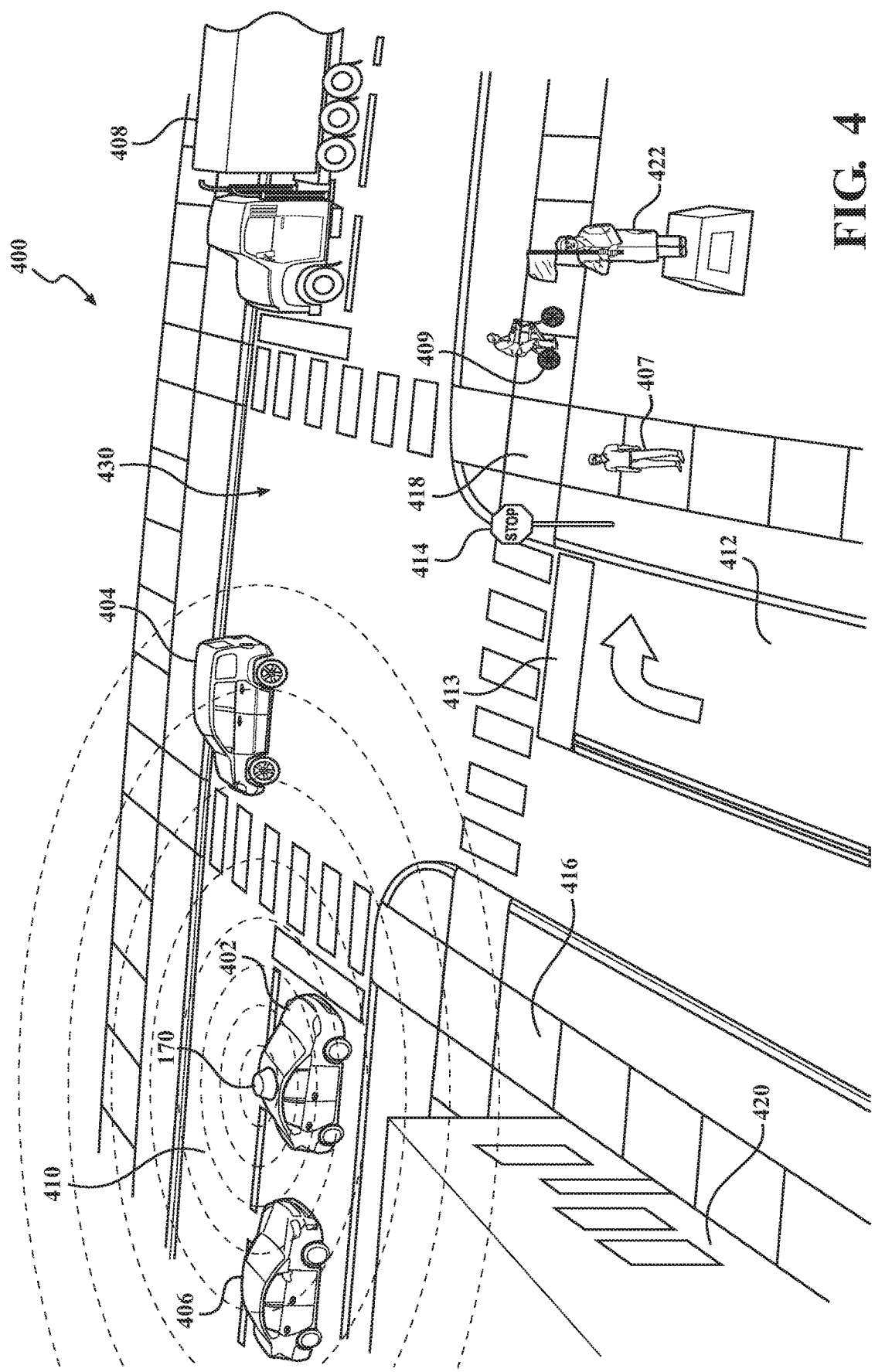
FIG. 4 is an aerial view of a vehicle employing a successive modeling system in a vehicular environment, according to one embodiment.

FIG. 4 depicts the successive modeling system 170 as used in an environment 400, according to one embodiment. The successive modeling system 170 can include the elements described above with reference to FIGS. 1-3. The successive modeling system 170 can be used as part of the environment 400 for obtaining images, detecting detected objects and comparing 3D models with said detected objects for further recognition. As such, the successive modeling system 170 can include the sensor systems 120 or any other device or unit for obtaining a representation of or information about the detected objects. An autonomous vehicle 402, depicted in FIG. 4, can include modules of the successive modeling system 170 stored in a data store 115, as described with reference to FIGS. 1-3.

The environment 400 can be a vehicle environment. The vehicle environment, as used herein, is defined as an area, covered by the field of detection for the sensor system, having a purpose of operating or storing a vehicle. Examples of vehicle environments include highways, intersections, parking lots, airports, bike paths, race tracks, off-road tracks, or other environments in which vehicles operate. The environment 400 can include a plurality of stationary objects and a plurality of detected objects. Detected objects can include pedestrians, motorized vehicles (both autonomous and human-operated), human powered vehicles (e.g., bicycles, skateboards, etc.) and/or other objects which can affect control considerations in the operation of an autonomous vehicle or human-operated vehicle.

The successive modeling system 170, included as part of the vehicle 100, and the sensor systems 120, is shown incorporated in the autonomous vehicle 402. The successive modeling system 170, as positioned in or on the autonomous vehicle 402, can view or otherwise detect the entirety of the environment 400 with minimal obstruction. The environment 400, depicted here, is a vehicle environment, as described above. Shown here, the environment 400 has a first road 410 intersecting with a second road 412. Traffic in the environment 400 is primarily controlled by a stop sign 414 and road surface markings 413, which include lines separating traffic, arrows indicating the proper lanes for turns and crosswalks for pedestrian traffic. In one embodiment, the successive modeling system 170 can include instructions for the object detection module 220, the hypothesis module 230, the comparison module 240, or combinations thereof. In one embodiment, autonomous vehicle 402 can include the successive modeling system 170, the sensor systems 120, the database 210, the processor 110, and other systems and device, as implemented in the vehicle 100. The database 210 can also contain instructions for modules 220, 230, 240 and 300, as described with reference to FIG. 1-3. Below, we discuss the interaction between the autonomous vehicle 402 and the environment 400, with reference to the examples.

Shown here, the object detection module 220 of the successive modeling system 170 is being executed by the processor 110 of the autonomous vehicle 402, causing the processor 110 to receive environmental data and detection data from the sensor systems 120 to monitor the environment 400. The successive modeling system 170, through execution by the processor 110, detects numerous components of the environment 400, including the first road 410, the second road 412, the stop sign 414, the road surface markings 413 (including arrows, crosswalks, and lane indicators), the intersection 430, and the detected objects (shown here as a first automobile 404, a second automobile 406, a pedestrian 407, a large truck 408, and a bicycle 409). Objects such as the first road 410, the second road 412, the stop sign 414, the road surface markings 413 (including arrows, a crosswalk, and lane indicators), and the intersection 430 can be referred to as stationary objects, as their pose in the environment does not substantially change. The object detection module 220 can further include instructions to differentiate between stationary objects and detected objects. The environmental data, collected by the object detection module 220, can further include seasonal data, weather data or other atmospheric data.

The object detection module 220, through execution by the autonomous vehicle 402, then examines the detected objects for detection data. In this embodiment, the object detection module 220 forms a hypothesis, using shape, size, position and other indicators, such as speed, that the first automobile 404 is a motorized vehicle. A variety of other data points are collected simultaneously for later processing, as necessary, in the successive modeling system 170. The data points collected regarding the first automobile 404 can include visual and thermal imaging, sound data, movement data (including position, direction, velocity and acceleration, and changes in each), RADAR and LIDAR data, and other data which can provide details in object recognition The object detection module 220, through execution by the autonomous vehicle 402, further detects the second automobile 406 and the large truck 408. The object detection module 220 then collects detection data for the second automobile 406 and the large truck 408. The data points for the detection data can be substantially similar to the data points described with reference to the first automobile 404. In this example, each of the second automobile 406, the pedestrian 407, the large truck 408, and the bicycle 409 are generally detected in size and shape, and object class, as above. The object class for each of the detected objects can be at a minimal level for differentiation from each other or for grouping. In one example, the first automobile 404, the second automobile 406 and the large truck 408 are classified as motorized vehicles, the pedestrian 407 is classified as a non-vehicular moving object, the bicycle 409 is classified as human-powered vehicle The environmental data and the detection data can then be stored in the detection information 260 in the database 210, as described with reference to vehicle 100.

The detection information 260, through execution by the autonomous vehicle 402, is then forwarded to the hypothesis module 230. After receiving the detection information 260, the hypothesis module 230 uses one or more detected parameters, such as size, shape, visual indicators, color, RADAR data, LIDAR data, thermal imaging, and others, to create a detection hypothesis. The detection hypothesis includes at least a computer-generated theory as to the object type and one or more 3D models corresponding to the object type. The object type used can be a general type, such as compact car or light truck. In other embodiments, the object type can be specific, such as 2002-2008 Toyota Tacoma®. In yet further embodiments, the object types used may be combinations of general and specific object types. In this example, the object type is a general type, for clarity of discussion. Here, the hypothesis module 230 creates a detection hypothesis that the first automobile 404 is a mid-size car and associates four (4) 3D models with the detection hypothesis.

The hypothesis module 230 then uses the detection information 260 generated in relation to the second automobile 406, the pedestrian 407, the large truck 408, and the bicycle 409 to generate further detection hypotheses. In some embodiments, the position, lighting, inclement weather, or other effects can reduce detection capability. As such, more than one detection hypothesis can be presented. In one example, the second automobile 406 is positioned directly behind and close to the autonomous vehicle 402, thus obscuring the detection data regarding the sides or the back. In this example, the hypothesis module 230 can create two detection hypotheses that the second automobile 406 is a mid-size car or a light truck. Each detection hypothesis then can have a set of 3D models associated with it, such as five (5) and three (3) 3D models respectively. In other examples, there can be ample data for forming a detection hypothesis. Shown here, the hypothesis module 230 creates a detection hypothesis that the large truck 408 is an 18-wheeler truck and associates one (1) 3D model with the detection hypothesis. Further, the hypothesis module 230 creates detection hypotheses that the bicycle 409 is a bicycle and that the pedestrian 407 is a person, and associates one (1) 3D model with each of the detection hypotheses. In further embodiments, the hypothesis module can include instructions to form a revised detection hypothesis. The revised detection hypothesis can be formed in response to a denied detection hypothesis or concurrent with the detection hypothesis.

The detection hypotheses and the corresponding 3D models, through execution by the autonomous vehicle 402, are then transferred to and processed by the comparison module 240. The comparison module 240 can then determine or use a variety of distinctive locations from the 3D model to compare against identified distinctive locations selected from the detection information 260 about the first automobile 404. Location estimators, as described above, can also be determined for each of the distinctive locations. In some embodiments, the distinctive locations on the 3D model are predetermined for the detection hypothesis. In further embodiments, the 3D model is analyzed and processed as compared to similar 3D models in the model information 270 by the comparison module 240 to determine distinctive locations. Preexisting or determined distinctive locations can be indexed and stored as part of the model information 270.

Using the detection hypothesis of mid-size car and the associated 3D models, the comparison module 240 first determines the available distinctive locations from the 3D model. Available distinctive locations can be related to the pose of the detected object, or other factors which can obscure the availability of the identified distinctive locations in the detection information 260. Here, the positioning of the first automobile 404, as compared to the position of the autonomous vehicle 402, obscures much of the top of the first automobile 404, the passenger side and the rear end. As such, the distinctive locations related to the obscured regions of the first automobile 404 are excluded from the comparison. In this example, the distinctive locations of the 3D model include portions of the door handle, specific angles in the front driver's side quarter panel, and a corner location on the driver's side headlight. Then, the distinctive locations are compared to the identified distinctive locations from the detection information 260. The identified distinctive locations can be determined from imaging data of the first automobile 404, which can be available in the detection information 260. As the distinctive locations are confirmed in the identified distinctive locations, the hypothesis is not rejected. As the distinctive locations are considered unique, if the distinctive locations are not rejected, then the hypothesis is considered confirmed. Thus, the first automobile is confirmed as a mid-size car.

The comparison module 240 then compares distinctive locations of the respective 3D models as compared to the identified distinctive locations from the detection information 260, generated in relation to the second automobile 406, the pedestrian 407, the large truck 408, and the bicycle 409 to reject or, by default, confirm the detection hypotheses. In some embodiments, there are multiple detection hypotheses, of which one or more can be rejected. In the example above, the second automobile 406 has two detection hypotheses that the second automobile 406 is a mid-size car or a light truck, of which the light truck detection hypothesis is forwarded to the comparison module 240, with the three (3) 3D models. Here, the comparison module 240 determines the distinctive locations and compares to the identified distinctive locations from the detection information 260, rejecting each of the 3D models and thus rejecting the hypothesis. Though rejection of all of the 3D models is described here as a rejection of the detection hypothesis, rejection of any one of the 3D models can also create a rejection of the detection hypothesis, in some embodiments. In other examples, distinctive locations can be confirmed in the identified distinctive locations, and the detection hypothesis can be maintained. Shown here, the detection hypothesis that the large truck 408 is an 18-wheeler truck, that the bicycle 409 is a bicycle, and that the pedestrian 407 is a person, are confirmed by the comparison of distinctive locations, through the comparison module 240, as described above.

In the instance of a rejected hypotheses, the successive modeling system 170 can determine the next course of action to resolve the rejection. The successive modeling system 170 can include instructions that when executed by the one or more processors, such as the processor 110, cause the one or more processors to receive the rejected hypothesis, if available, and select between available courses of action. As described with reference to FIG. 3, the successive modeling system 170 can use an existing alternative hypothesis to reinitialize the comparison module 240, reinitialize the hypothesis module 230 to revise the detection hypothesis, reinitialize the object detection module 220 to begin the process of the successive modeling system again, or other outcomes. In the above example, the comparison module 240 rejected the light truck detection hypothesis for second automobile 406 including the three (3) 3D models. In this example, the successive modeling system 170 can access the mid-size car detection hypothesis for the second automobile 406 having the five (5) 3D models associated. This detection hypothesis is then forwarded to the comparison module 240 to perform a further comparison.

In further embodiments, the branch module can, through execution by the autonomous vehicle 402, direct the hypothesis module 230 to create a revised hypothesis. The revised hypothesis may be created in the presence or the absence of a rejection from the comparison module 240. Revised hypothesis is a hypothesis about other aspects of the detected object, such as what the detected object is doing in the environment 400 or other detected objects which are in some way interacting with the detected object. In one embodiment, the revised hypothesis can be created about the bicycle 409. Here, the revised hypothesis can be that, based on speed and wheel position, the bicycle is likely to collide with the pedestrian 407. The detection information 260 previously created by the object detection module 220 can be reused or detection information 260 can be newly acquired for this purpose. The revised hypothesis can be analyzed in the same manner as the detection hypothesis. As above, the revised hypothesis and the associated 3D models can be compared to the detection information at distinctive revised locations and equivalent revised locations respectively. The comparison can include the determination of location estimators for at least one of the distinctive revised locations. As with the detection hypothesis, the revised hypothesis can be then rejected if a distinctive revised location is not confirmed.

As shown here, there are multiple detected objects in the environment, all of which are interacting with the environment in a way which may ultimately affect the decision making of the autonomous vehicle 402. The pedestrian 407 can enter the first road 410, at an area not protected by a crosswalk. There may be obstructions to the autonomous vehicle 402 ability to detect detected objects, such as a building 420. The bicycle 409 may choose to either cross the second road 412 (thus becoming a possible collision, should the autonomous vehicle 402 choose to turn). There are objects which might be momentarily confused for detected objects in the environment 400, such as the statue 422. By using a successive modeling system, object recognition can be sped up, saving valuable processing time in real world situations and allowing the autonomous vehicle 402 to respond to detected objects, as they become available. Finally, the sheer number of detected objects available can become a burden on the autonomous driving module 160. By reducing the processing power dedicated to any one detection and recognition, the autonomous vehicle 402 can respond to a more active environment more efficiently.

Other and further embodiments of the methods described above are contemplated, including combinations of or deletions from said methods, without specific recitation thereof. In one embodiment, the branch module can further include instructions to request a revised hypothesis from the hypothesis module. In another embodiment, the hypothesis module can include instructions for the revised hypothesis, the revised hypothesis comprising associating a 3D model from model information using the detection information. In another embodiment, the comparison module can include instructions to compare one or more distinctive locations of the 3D model to one or more identified distinctive locations derived from the detection information to validate the revised hypothesis. In another embodiment, the detection hypothesis can further include instructions for at least an object type hypothesis. In another embodiment, the detection hypothesis can further includes a plurality of 3D models. In another embodiment, the comparison module further includes instructions to compare the distinctive locations of each of the plurality of 3D models of the detection hypothesis to the identified distinctive locations of the detection information sequentially. In another embodiment, at least one of the one or more distinctive locations can include one or more location estimators. In another embodiment, the hypothesis module can further include instructions for a revised hypothesis. The revised hypothesis can include associating a 3D model from model information, using the detection information. The comparison module can further include instructions to compare one or more distinctive revised locations of the 3D model to one or more equivalent revised locations derived from the detection information to validate the revised hypothesis. In another embodiment, at least one of the one or more distinctive revised locations can include one or more location estimators.

Figure 5:
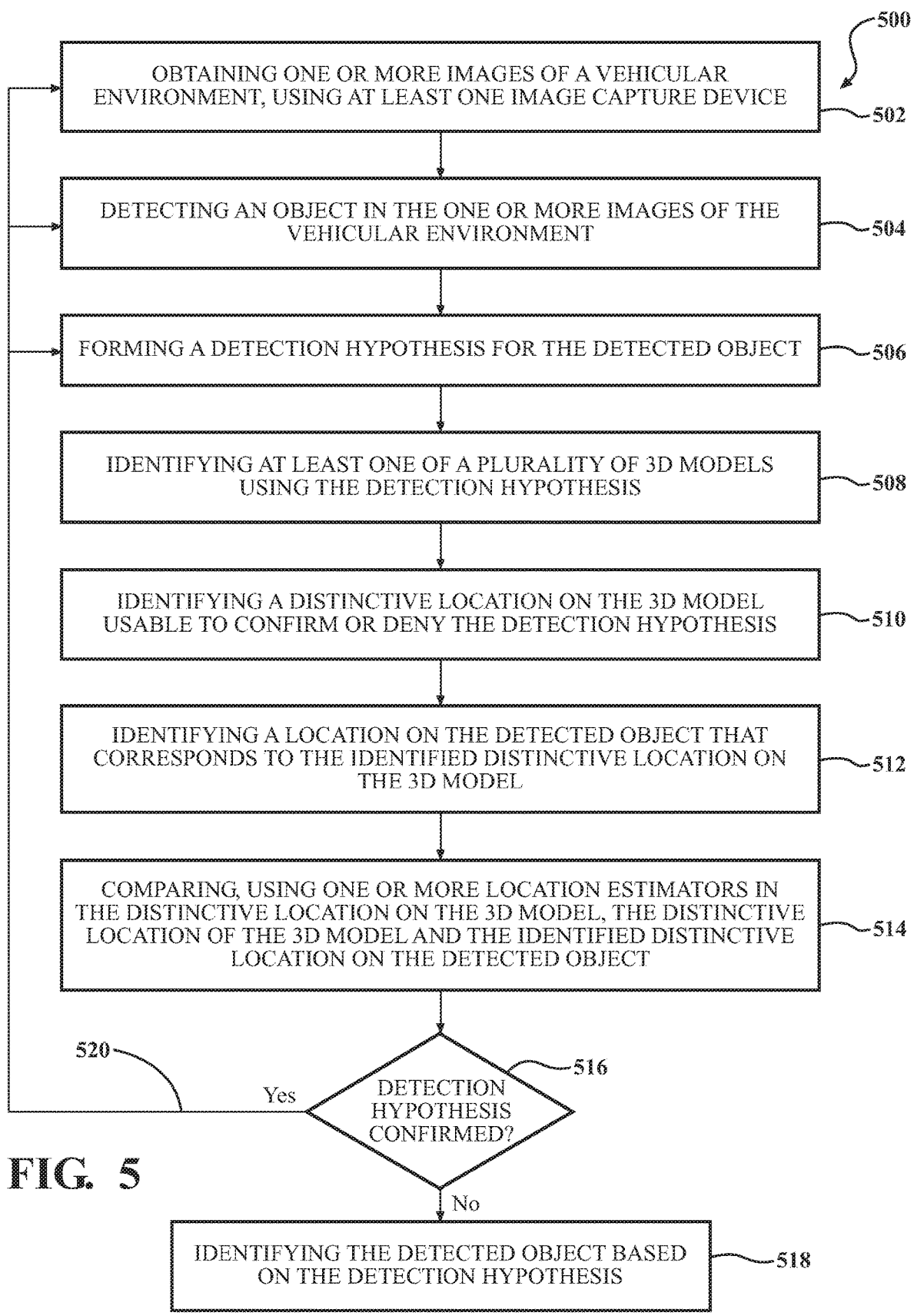
FIG. 5 is a flow diagram of a method for using optimal experimental design to recognize objects, according to embodiments described herein.

FIG. 5 is a flow diagram of a method 500 for predicting object actions in an environment. The method 500 includes scanning an environment, such as a vehicle environment for detected objects. When a detected object is detected, the method 500 collects information about the object and uses that information to formulate a hypothesis, such as a detection hypothesis. The detection hypothesis can include selecting one or more 3D models from a database. The 3D models are compared at distinct locations. In some embodiments, location estimators are employed in comparing the distinctive locations and the identified distinctive locations. The method 500 can include obtaining one or more images of a vehicular environment, using at least one image capture device, at 502. An object can then be detected in the images of the vehicular environment, at 504. A detection hypothesis can then be formed for the detected object, at 506. At least one of a plurality of 3D models can then be identified using the detection hypothesis, at 508. A distinctive location on the 3D model can then be identified, at 510. A location on the detected object can then be identified, the identified location corresponding to the identified distinctive location on the 3D model, at 512. The distinctive location of the 3D model and the identified distinctive location on the detected object can be compared using location estimators, at 514. The method 500 can then determine whether the detection hypothesis is confirmed or denied based on the comparison, at 516. Finally, the detected object can be identified based on the detection hypothesis, at 518. The method 500 is discussed in further detail below.

The method 500 can include obtaining one or more images of a vehicular environment, using at least one image capture device, at 502. The vehicular environment can be monitored by a computing device, a semi-autonomous vehicle, or an autonomous vehicle, in connection with one or more sensors, such as the sensor system 120. In one embodiment, the vehicular environment is monitored using the camera 126 of the sensor system 120. The camera 126 can captures one or more images of the vehicular environment. The one or more images can be captured at regular intervals, continuously or based on other frequencies or parameters, as dictated by the sensor system and other connected systems.

An object can then be detected in the one or more images of the vehicular environment, at 504. The one or more images can include an object to be detected. Thus, the images can be monitored as part of a system, such as the successive modeling system 170. The monitoring can be performed using the object detection module 220 of the successive modeling system 170, described with reference to FIGS. 1-2. The computing device can be any appropriate type of computing device such as, but not limited to, a personal computer (PC), workstation, embedded computer, or stand-alone device with a computational unit, such as a microprocessor, DSP (digital signal processor), FPGA (field programmable gate array), or ASIC (application specific integrated circuit). The environmental data and the detection data can then be combined as detection information, as described above. In one embodiment, the monitoring of the vehicular environment can be performed by an autonomous vehicle, such as the autonomous vehicle 402 described above with reference to FIG. 4. The environmental data and the detection data can be substantially as described with reference to FIG. 1-4.

A detection hypothesis can then be formed for the detected object, at 506. Using the detection information, the method 500 can then form a detection hypothesis. The detection hypothesis is a determination regarding object type, object class, specific object or other object related classification, as related to the detected object. The detection hypothesis can be substantially similar to the detection hypothesis described with reference to FIGS. 2 and 4. The detection hypothesis can include associating a 3D model from model information using the detection information. The detection hypothesis can be formed by a system, such as the successive modeling system 170, described with reference to FIG. 2.

The 3D models can then be identified using the detection hypothesis, at 508. The 3D model can be selected from model information, which may be stored locally or remotely. The model information may be part of a database, such as model information 270 in the database 210, described with reference to FIG. 2. In one embodiment, the at least one of the plurality of 3D models can be selected as part of a system, such as the successive modeling system 170 described above with reference to FIG. 2. The successive modeling system 170, using the hypothesis module 230 as executed by the processor 110, can use the detection hypothesis to select 3D models which may be related to the detected object, using the model information 270. The 3D models can correspond to detected objects likely to be found within the environment. The model information 270 can include both detected objects and other objects, such as stationary objects. In one embodiment, multiple detection hypotheses may be created regarding the detectable object.

A distinctive location on the 3D model can then be identified, where the distinctive location is usable to confirm or deny the detection hypothesis, at 510. The model information 270 can include one or more distinctive locations for each of the 3D models. The distinctive locations are locations on a 3D model which can be determinative of the detection hypothesis. The distinctive locations can be substantially similar to the distinctive locations described above, with reference to FIG. 2. The distinctive locations can be determined as part of a system, such as the successive modeling system 170 using a hypothesis module 230, described with reference to FIG. 2.

A location on the detected object can then be identified, the identified location corresponding to the identified distinctive location on the 3D model, at 512. The method 500 can use the one or more distinctive locations from the 3D model to compare against one or more identified distinctive locations of the detected object. The identified distinctive locations can be dispositive of the detection hypothesis when compared to the detected object. Specifically, if the identified distinctive locations are determined to be equivalent to the distinctive locations of the 3D model, the hypothesis can remain confirmed. The identified distinctive locations can be determined based on pose of the detected object within the environment. The distinctive locations can be determined as part of a system, such as the successive modeling system 170 using a hypothesis module 230, described with reference to FIG. 2.

Using location estimators in the distinctive location on the 3D model, the distinctive location of the 3D model and the identified distinctive location on the detected object can be compared, at 514. The one or more distinctive locations can include location estimators. Location estimators are locations within the distinctive location, which can be used to precisely confirm or deny the presence of the identified distinctive location to the detectible location, without analyzing the entire identified distinctive location. If one of the one or more distinctive locations cannot be confirmed, a rejection of the detection hypothesis can then be created. The location estimators can be determined as part of a system, such as the successive modeling system 170 using a hypothesis module 230, described with reference to FIG. 2.

The method 500 can then determine whether the detection hypothesis is confirmed or denied based on the comparison, at 516. As described above, the distinctive locations from the 3D model can be compared to the identified distinctive locations of the detection information. The comparison can include location estimators for at least one of the one or more distinctive locations. If one of the one or more distinctive locations cannot be confirmed, a rejection of the revised detection hypothesis is created. Confirming or denying detection hypothesis can be performed as part of a system, such as the successive modeling system 170, described above with reference to FIG. 2.

The detected object can then be identified based on the detection hypothesis, when the detection hypothesis is confirmed, at 518. Here, the method 500 reviews the comparisons of the at least one of the plurality of 3D models to determine which ones have been rejected. If the distinctive locations are not rejected, then the 3D model is not rejected. As such, the 3D model not rejected is confirmed. Once the 3D model is confirmed, the associated detection hypothesis is confirmed with regards to the detected object. The identification of the detected object can be performed as part of a system, such as the successive modeling system 170, described above with reference to FIG. 2.

Optionally, the method 500 can include forming a revised detection hypothesis in light of a rejection, at 520. The revised detection hypothesis can be created in response to a rejection of the detection hypothesis. The revised detection hypothesis can include reinitializing the method 500, by performing the embodiments described at elements 502, 504, or 506. With the method 500 reinitialized, the elements of the method 500 can be performed sequentially between the selected element and the decision block 516 can then be reperformed. Once the elements have been performed to the point of creating a new comparison, the detection hypothesis can be confirmed or denied based on the comparison. The decision at 516 can then be repeated one or more times until the detection hypothesis is confirmed. Once confirmed, the detected object is identified, as described at 518. The forming of the revised detection hypothesis can be performed by a system, such as the successive modeling system 170. In one embodiment, the successive modeling system 170 includes instructions receive a denial of the detection hypothesis, and to reinitialize the object detection module 220, the hypothesis module 230, the comparison module 240 or combinations thereof, wherein reinitializing includes executing at least a portion of the instructions of said module.

In one example, the method 500 can be reinitialized by obtaining a replacement set of the one or more images of the vehicular environment, using the method 500 at element 502. In this embodiment, all previous data and information can be stored for later use or discarded, as appropriate. The method 500 can then collect one or more images of the vehicular environment, detect the object in the one or more images, form a revised detection hypothesis, and others as described between elements 502 and 516, to determine whether the revised detection hypothesis is confirmed or denied.

In another example, the method 500 can be reinitialized by detecting a replacement for the object detected in the one or more images, using the method 500 at element 504. In this embodiment, the replacement detected object can be the detected object in a new position or location. In a further embodiment, the replacement detected object can be a new object. The method 500 can then form a revised detection hypothesis, and others as described between elements 504 and 516, to determine whether the revised detection hypothesis is confirmed or denied.

In another example, the method 500 can be reinitialized at 506 by forming a revised detection hypothesis, including associating a 3D model from model information using the detection information, at 506. The detection information can be the same as originally collected, at 502, using the sensors and monitoring previously described. Forming the revised detection hypothesis can be performed as part of a system, such as the successive modeling system 170, described above with reference to FIG. 2. The selection of the 3D model can include using information derived from the comparison of the distinctive locations, including, but not limited to, the reasons for rejection of the detection hypothesis.

Thus using the method 500 described above, and the successive comparison of identified distinctive locations from detection information to distinctive locations on 3D models, the hypothesis can be validated more efficiently. The method 500 described here saves valuable time for real world systems, which may be dealing with other bottlenecks for processing or transmission. Further, the systems, devices and methods described herein, provide for handling of multiple instances of detected objects, simultaneously increasing the load tolerance of real world object recognition in autonomous and semi-autonomous vehicles.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

Referring to FIG. 1, an example of the vehicle 100 is illustrated. As used herein, a "vehicle" is any form of motorized transport. In one or more embodiments, the vehicle 100 is an automobile. While arrangements will be described herein with respect to automobiles, it will be understood that embodiments are not limited to automobiles. In some embodiments, the vehicle 100 may be any other form of motorized transport that, for example, can operate at least semi-autonomously, includes a successive modeling system or capabilities to support a successive modeling system, and thus benefits from the functionality discussed herein. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include a processor 110. In one or more arrangements, the processor 110 can be a main processor of the vehicle 100. In one example, the processor 110 can be an electronic control unit (ECU). Depending on the desired configuration, the processor 110 can be of any type for use in the data processing and analysis described herein. The processor 110 can be a microprocessor (μR), a microcontroller (X), a digital signal processor (DSP), or any combination thereof. The processor 110 can be a set of one or more processors or can be a multi-processor core, depending on the particular implementation. Further, processor 110 can be one or more heterogeneous processor systems, in which a main processor is present with revised processors on a single chip. In another example, the processor 110 can be a symmetric multi-processor system containing multiple processors of the same type. Further combinations or permutations of the processor 110 are contemplated without specific recitation herein.

The vehicle 100 can include a data store 115. The data store 115 is any piece of hardware that is capable of storing data or information. Examples of data or information which can be stored in the data store 115 include, without limitation, data, program code in functional form, and/or other suitable information either on a temporary basis and/or a permanent basis. The data store 115 can include one or more modules that include computer readable instructions that, when executed by the processor 110, cause the processor 110 to perform methods and functions that are discussed herein. The data store 115 can include volatile and/or non-volatile memory. An example of the data store 115 can include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operably connected to the processor 110 for use thereby. The media used by data store 115 can be removable. For example, a removable hard drive can be used for data store 115. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road surface markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, system or combination thereof that can detect and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor 110, the data store 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 further includes a successive modeling system 170 that is implemented to perform methods and other functions as disclosed herein relating to hypothesis-driven detected object recognition as confirmed through multi-point 3D model comparisons. The vehicle 100 can also include an object detection module for automated detection of a detected object, such as object detection module 220, described with reference to FIG. 2 below. The object detection module 220 can be in communication with or a part of the successive modeling system 170.

The processor 110 and/or the autonomous driving module(s) 160 can be operably connected to communicate with the various embodiments of the vehicle systems 140 and/or individual components thereof. For example, the processor 110 and/or the autonomous driving module(s) 160 can be in communication to send and/or receive information from the various embodiments of the vehicle systems 140 to control the movement, speed, maneuvering, heading, direction, etc. of the vehicle 100. The processor 110 and/or the autonomous driving module(s) 160 may control some or all of these vehicle systems 140 and, thus, may be partially or fully autonomous.

The processor 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor 110 and/or the autonomous driving module(s) 160 can control the direction and/or speed of the vehicle 100. The processor 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor 110, or one or more of the modules can be executed on and/or distributed among other processing systems to which the processor 110 is operably connected. The modules can include instructions (e.g., program logic) executable by one or more processor 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the successive modeling system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A successive modeling system for object recognition in an environment, comprising:
   one or more processors; and
   a memory communicably coupled to the one or more processors and storing:
   an object detection module including instructions that when executed by the one or more processors cause the one or more processors to obtain one or more images of a vehicular environment, using at least one image capture device, and to detect an object in the one or more images of the vehicular environment;
   a hypothesis module including instructions that when executed by the one or more processors cause the one or more processors to form a detection hypothesis for the detected object, the detection hypothesis being an object type hypothesis, to identify at least one of a plurality of 3D models using the detection hypothesis, to identify a distinctive location on the 3D model usable to confirm or deny the detection hypothesis; and
   a comparison module including instructions that when executed by the one or more processors cause the one or more processors to identify a location on the detected object that corresponds to the identified distinctive location on the 3D model, to compare, using one or more location estimators in the distinctive location on the 3D model, the distinctive location of the 3D model and the identified distinctive location on the detected object, to determine whether the detection hypothesis is confirmed or denied based on the comparison, and to identify the detected object based on the detection hypothesis, when the detection hypothesis is confirmed,
   the hypothesis module further including instructions to form a revised detection hypothesis for the detected object, to identify at least one of a plurality of 3D models using the revised detection hypothesis, and to identify a revised distinctive location on the 3D model usable to confirm or deny the revised detection hypothesis.

2. The successive modeling system of claim 1, wherein the comparison module further includes instructions that when executed by the one or more processors cause the one or more processors to receive a denial of the detection hypothesis, and to reinitialize the object detection module, the hypothesis module, the comparison module, or combinations thereof, wherein reinitializing includes executing at least a portion of the instructions of the object detection module, the hypothesis module, the comparison module, or combinations thereof.

3. The successive modeling system of claim 1, wherein the hypothesis module further comprises instructions to identify two or more of the plurality of 3D models using the detection hypothesis, and to identify at least one distinctive location on each of the identified 3D models usable to confirm or deny the detection hypothesis, and wherein the comparison module further comprises instructions to identify at least one location on the detected object that corresponds to the at least one distinctive location on each of the identified 3D models, and to compare, using one or more location estimators in the at least one distinctive location on each of the identified 3D models, the at least one distinctive location of each of the identified 3D models and the at least one identified distinctive location on the detected object.

4. The successive modeling system of claim 1, wherein the one or more location estimators correspond to one or more pixels selected from the distinctive location, the one or more pixels being a minimum set of pixels for correlating the identified distinctive location and the distinctive location.

5. A successive modeling system for object recognition in an environment, comprising:
   one or more processors; and
   a memory communicably coupled to the one or more processors and storing:
   an object detection module including instructions that when executed by the one or more processors cause the one or more processors to obtain one or more images of a vehicular environment, using at least one image capture device, and to detect an object in the one or more images of the vehicular environment;
   a hypothesis module including instructions that when executed by the one or more processors cause the one or more processors to form a detection hypothesis for the detected object, to identify at least one of a plurality of 3D models using the detection hypothesis, and to identify a distinctive location on the 3D model usable to confirm or deny the detection hypothesis; and
   a comparison module including instructions that when executed by the one or more processors cause the one or more processors to identify a location on the detected object that corresponds to the identified distinctive location on the 3D model, to compare, using one or more location estimators in the distinctive location on the 3D model, the distinctive location of the 3D model and the identified distinctive location on the detected object, to determine whether the detection hypothesis is confirmed or denied based on the comparison, and to identify the detected object based on the detection hypothesis, when the detection hypothesis is confirmed,
   the hypothesis module further including instructions to form a revised detection hypothesis for the detected object, to identify at least one of a plurality of 3D models using the revised detection hypothesis, and to identify a revised distinctive location on the 3D model usable to confirm or deny the revised detection hypothesis, and
   the comparison module further including instructions to identify a revised location on the detected object that corresponds to the revised distinctive location on the 3D model, to compare, using one or more revised location estimators in the revised distinctive location on the 3D model, the revised distinctive location of the 3D model and the identified distinctive location on the detected object, to determine whether the revised detection hypothesis is confirmed or denied based on the comparison, and to identify the detected object based on the revised detection hypothesis, when the revised detection hypothesis is confirmed.

6. A non-transitory computer-readable medium for predicting object actions in an environment and storing instructions that when executed by one or more processors cause the one or more processors to:
   obtain one or more images of a vehicular environment, using at least one image capture device;
   detect an object in the one or more images of the vehicular environment;
   form a detection hypothesis for the detected object, the detection hypothesis being an object type hypothesis;
   identify at least one of a plurality of 3D models using the detection hypothesis;
   identify a distinctive location on the 3D model usable to confirm or deny the detection hypothesis;

identify a location on the detected object that corresponds to the identified distinctive location on the 3D model;

compare, using one or more location estimators in the distinctive location on the 3D model, the distinctive location of the 3D model and the identified distinctive location on the detected object;

determine whether the detection hypothesis is confirmed or denied based on the comparison;

identify the detected object based on the detection hypothesis, when the detection hypothesis is confirmed;

form a revised detection hypothesis for the detected object;

identify at least one of a plurality of 3D models using the revised detection hypothesis; and identify a revised distinctive location on the 3D model usable to confirm or deny the revised detection hypothesis.

7. The non-transitory computer-readable medium of claim 6, further comprising instructions to identify two or more of the plurality of 3D models using the detection hypothesis, to identify at least one distinctive location on each of the identified 3D models usable to confirm or deny the detection hypothesis, to identify at least one location on the detected object that corresponds to the at least one distinctive location on each of the identified 3D models, and to compare, using one or more location estimators in the at least one distinctive location on each of the identified 3D models, the at least one distinctive location of each of the identified 3D models and the at least one identified distinctive location on the detected object.

8. The non-transitory computer-readable medium of claim 6, wherein the one or more location estimators correspond to one or more pixels selected from the distinctive location, the one or more pixels being a minimum set of pixels for correlating the identified distinctive location and the distinctive location.

9. A non-transitory computer-readable medium for predicting object actions in an environment and storing instructions that when executed by one or more processors cause the one or more processors to:

obtain one or more images of a vehicular environment, using at least one image capture device;

detect an object in the one or more images of the vehicular environment;

form a detection hypothesis for the detected object;

identify at least one of a plurality of 3D models using the detection hypothesis;

identify a distinctive location on the 3D model usable to confirm or deny the detection hypothesis;

identify a location on the detected object that corresponds to the identified distinctive location on the 3D model;

compare, using one or more location estimators in the distinctive location on the 3D model, the distinctive location of the 3D model and the identified distinctive location on the detected object;

determine whether the detection hypothesis is confirmed or denied based on the comparison;

identify the detected object based on the detection hypothesis, when the detection hypothesis is confirmed;

form a revised detection hypothesis for the detected object;

identify at least one of a plurality of 3D models using the revised detection hypothesis;

identify a revised distinctive location on the 3D model usable to confirm or deny the revised detection hypothesis;

identify a revised location on the detected object that corresponds to the revised distinctive location on the 3D model;

compare, using one or more revised location estimators in the revised distinctive location on the 3D model, the revised distinctive location of the 3D model and the identified distinctive location on the detected object;

determine whether the revised detection hypothesis is confirmed or denied based on the comparison; and identify the detected object based on the revised detection hypothesis, when the revised detection hypothesis is confirmed.

10. A method for discrete object monitoring, comprising:

obtaining one or more images of a vehicular environment, using at least one image capture device;

detecting an object in the one or more images of the vehicular environment;

forming a detection hypothesis for the detected object, the detection hypothesis being an object type hypothesis;

identifying at least one of a plurality of 3D models using the detection hypothesis;

identifying a distinctive location on the 3D model usable to confirm or deny the detection hypothesis;

identifying a location on the detected object that corresponds to the identified distinctive location on the 3D model;

comparing, using one or more location estimators in the distinctive location on the 3D model, the distinctive location of the 3D model and the identified distinctive location on the detected object;

determining whether the detection hypothesis is confirmed or denied based on the comparison;

identifying the detected object based on the detection hypothesis, when the detection hypothesis is confirmed;

forming a revised detection hypothesis for the detected object;

identifying at least one of a plurality of 3D models using the revised detection hypothesis; and identifying a revised distinctive location on the 3D model usable to confirm or deny the revised detection hypothesis.

11. The method of claim 10, further comprising:

identifying two or more of the plurality of 3D models using the detection hypothesis;

identifying at least one distinctive location on each of the identified 3D models usable to confirm or deny the detection hypothesis, identifying at least one location on the detected object that corresponds to the at least one distinctive location on each of the identified 3D models; and comparing, using one or more location estimators in the at least one distinctive location on each of the identified 3D models, the at least one distinctive location of each of the identified 3D models and the at least one identified distinctive location on the detected object.

12. The method of claim 10, wherein the one or more location estimators correspond to one or more pixels selected from the distinctive location, the one or more pixels being a minimum set of pixels for correlating the identified distinctive location and the distinctive location.

13. The successive modeling system of claim 1, wherein the revised detection hypothesis for the detected object is formed responsive to the detection hypothesis being denied.

14. The successive modeling system of claim 5, wherein the revised detection hypothesis for the detected object is formed responsive to the detection hypothesis being denied.

15. The non-transitory computer-readable medium of claim 6, wherein the revised detection hypothesis for the detected object is formed responsive to the detection hypothesis being denied.

16. The non-transitory computer-readable medium of claim 9, wherein the revised detection hypothesis for the detected object is formed responsive to the detection hypothesis being denied.

17. The method of claim 10, wherein the revised detection hypothesis for the detected object is formed responsive to the detection hypothesis being denied.

18. A method for discrete object monitoring, comprising:
    obtaining one or more images of a vehicular environment, using at least one image capture device;
    detecting an object in the one or more images of the vehicular environment;
    forming a detection hypothesis for the detected object;
    identifying at least one of a plurality of 3D models using the detection hypothesis;
    identifying a distinctive location on the 3D model usable to confirm or deny the detection hypothesis;
    identifying a location on the detected object that corresponds to the identified distinctive location on the 3D model;
    comparing, using one or more location estimators in the distinctive location on the 3D model, the distinctive location of the 3D model and the identified distinctive location on the detected object;
    determining whether the detection hypothesis is confirmed or denied based on the comparison; and
    identifying the detected object based on the detection hypothesis, when the detection hypothesis is confirmed;
    forming a revised detection hypothesis for the detected object;
    identifying at least one of a plurality of 3D models using the revised detection hypothesis;
    identifying a revised distinctive location on the 3D model usable to confirm or deny the revised detection hypothesis
    identifying a revised location on the detected object that corresponds to the revised distinctive location on the 3D model;
    comparing, using one or more revised location estimators in the revised distinctive location on the 3D model, the revised distinctive location of the 3D model and the identified distinctive location on the detected object;
    determining whether the revised detection hypothesis is confirmed or denied based on the comparison; and
    identifying the detected object based on the revised detection hypothesis, when the revised detection hypothesis is confirmed.

19. The successive modeling system of claim 5, wherein the detection hypothesis comprises an object type hypothesis.

20. The non-transitory computer-readable medium of claim 9, wherein the detection hypothesis further comprises an object type.

* * * * *